United States Patent [19]
Ecer

[11] Patent Number: 5,812,925
[45] Date of Patent: Sep. 22, 1998

[54] LOW TEMPERATURE BONDING OF MATERIALS

[76] Inventor: Gunes M. Ecer, P.O. Box 4025, Thousand Oaks, Calif. 91359

[21] Appl. No.: 735,934

[22] Filed: Oct. 23, 1996

[51] Int. Cl.$^6$ ......................................... B22F 7/04
[52] U.S. Cl. .................... 428/548; 428/554; 428/558; 419/8; 419/22; 419/36; 419/48; 419/57
[58] Field of Search .................. 419/8, 9, 48, 22, 419/57, 36; 428/548, 554, 558

[56] References Cited

U.S. PATENT DOCUMENTS

| | | | |
|---|---|---|---|
| 3,716,347 | 2/1973 | Bergstrom et al. | 29/182.2 |
| 4,029,476 | 6/1977 | Knopp | 428/676 |
| 4,126,451 | 11/1978 | Nayar | 75/208 R |
| 4,324,356 | 4/1982 | Blair et al. | 228/193 |
| 4,331,286 | 5/1982 | Miyazaki et al. | 228/198 |
| 4,412,643 | 11/1983 | Sato et al. | 228/221 |
| 4,434,211 | 2/1984 | Shoher et al. | 428/552 |
| 4,485,961 | 12/1984 | Ekbom et al. | 228/193 |
| 4,676,843 | 6/1987 | Nazmy | 148/11.5 N |
| 4,710,235 | 12/1987 | Scruggs | 148/4 |
| 4,804,132 | 2/1989 | DiFrancesco | 228/115 |
| 5,083,697 | 1/1992 | DiFrancesco | 228/116 |
| 5,288,351 | 2/1994 | Hoang et al. | 156/89 |
| 5,318,214 | 6/1994 | Lucas, Jr. et al. | 228/121 |
| 5,361,971 | 11/1994 | Williams et al. | 228/193 |
| 5,564,064 | 10/1996 | Martin | 419/5 |

*Primary Examiner*—Daniel J. Jenkins
*Attorney, Agent, or Firm*—William W. Haefliger

[57] ABSTRACT

A method for joining a first metal surface to a second metal surface that includes providing powder metal particles substantially all of which have hardnesses lower than the hardnesses of the first and second metal surfaces, at normal temperatures; locating the particles in a layer between the first and second metallic surfaces, to form an assembly; heating the assembly to an elevated temperature or temperatures below the softening temperature of the first and second metallic surfaces; and effecting compression of the layer by and between the first and second surfaces at a pressure level or levels below the compressive yield strengths of the first and second surfaces, and above the compressive yield strengths of the particles, and for a time duration to effect a bond between the first and second metallic surfaces.

23 Claims, 1 Drawing Sheet

LOW TEMPERATURE BONDING OF MATERIALS

BACKGROUND OF THE INVENTION

This invention relates generally to joining and bonding of metal articles, and more particularly, to metallurgical bonding of metallic surfaces under high pressure and at elevated temperature below the softening temperature ranges of surfaces being joined.

Metals (here defined as pure metals and alloys) may be hardened by processes, such as cold working, precipitation hardening, and transformation hardening. When hardened, metals generally become stronger, while physical properties in general remain unchanged. When used in the hardened state, fabricated metal components can be lighter and more durable.

Other than mechanical fastening, most fabrication processes utilize high temperature joining methods, such as brazing, welding, and diffusion bonding. Such processes reduce strength by causing recrystallization of cold-worked metals, averaging of precipitation hardened alloys, and reversing the transformation hardening in some alloys. (In steels, martensitic structure may transform back to softer austenite.)

Many engineering components employ high temperature fabrication processes, which significantly lower material strength, and in turn, necessitate thicker and heavier sections to carry the same load. Here the word "strength" is used to represent any type of strength that is life limiting, such as ultimate tensile strength, yield strength, stress-rupture strength, fatigue strength, etc.

Most joining processes used for aerospace and automotive components involve temperatures above the solution or recrystallization temperatures of the metals being joined. In welded components, this means development of a weld heat-affected zone with properties inferior to those of the parent metal.

In components made of precipitation-hardened alloys, an overaged, low-strength structure is produced after brazing or diffusion bonding, followed by slow cooling. Most often, brazing and diffusion bonding cycles involve slow cooling because of the massive fixturing that must be used. Additionally, solution treating and aging treatments, after the final joining process is completed, are usually ruled out due to the possibility of distortion of the component.

The key to realization of weight savings is the availability of low-temperature joining processes. Low temperature in the case of cold-work strengthened alloys would mean temperatures below the recrystallization temperature. In the case of age hardened alloys, it would be at or below the age hardening temperature. In the case of transformation hardened materials, it would be at or below the transformation temperature. There are no low-temperature joining techniques at present that can create high bond strengths. The processes known as friction welding, ultrasonic welding, and explosive welding do create sound joints, but these processes require special joint geometries and are limited in size or shape capabilities.

None of the prior art examined addresses the issue of joining of metals, while in their hardened state. Additionally, none provides a joint strength near the hardened strength of the metal.

U.S. Pat. Nos. 5,083,697 and 4,804,132 describe a particle-enhanced joining process for metals. The particles include a core particulate composed of a material having a hardness greater than that of the metals to be bonded, and an outer layer of metal coating applied over the particles and one of the joint surfaces. By compressing the metal surfaces together, particles penetrate the metal of the joint, enhancing the ability to form diffusion bonds around the particles. The process does not provide 100% metallurgical bonding of the surfaces, but rather the bonding is largely due to mechanical locking. Because the particles are required to penetrate the joint surfaces, the process would not work if the materials being joined were in their hardened states.

U.S. Pat. No. 4,331,286 provides a pressure bonding method wherein the two dissimilar metals to be bonded are heated above the eutectic temperature of the two metals and pressure applied to cause a bond by forming a liquid eutectic at the interface. The fact that eutectic temperature must be reached before a bond has formed precludes any possibility of preserving a high-strength state in the metals being joined.

U.S. Pat. No. 4,485,961 discloses a method of welding by hot isostatic pressing (HIP) involving application of metal powder as fillets to a well-fitted joint, over which a second layer of glass powder is applied. Heating the assembly so that the glass layer forms a gas-impermeable barrier over the first layer, and applying an isostatic pressure at such an elevated temperature causes diffusion bonding to occur. This process is a high-temperature process, as defined above, and would destroy a hardened state of the metals being joined.

U.S. Pat. No. 5,361,971 discloses an intermediate temperature diffusion bonding process wherein the joint surfaces are gold coated and pressed together at an intermediate temperature to cause bonding of the gold. Here, the process provides a gold joint whose strength cannot be above the strength of pure gold, which is quite low.

SUMMARY OF THE INVENTION

It is a major object of the present invention to provide an improved method for joining metal articles that overcome problems and difficulties of prior methods, as referred to above.

It is an object of the invention to provide an improved low-temperature pressure bonding method for joining of metals and other materials. It is another object of the invention to provide a low-temperature pressure bonding method for joining hardened metals, while preserving substantially the hardened state of the metals after bonding.

It is another object of the invention to provide a low-temperature pressure bonding method for joining of metals by employing a layer of metallic powder at the joint interface.

It is yet another object of the invention to provide a low temperature bonding method for joining of metals while creating a joint interface layer that undergoes cold-work hardening during pressing.

It is yet another object of the present invention to provide a low temperature pressure bonding method for joining of metals by deforming an interface layer of powder particles and causing them to metallurgically bond to each other as well as to the metal surfaces being joined.

The present invention concerns a method of joining metals, preferably in their hardened states, by bringing the metal surfaces together, applying a layer of metal or metal alloy powder (interface powder) onto at least one of the joint surfaces, heating the assembly to a temperature below the softening temperature of the parent metals, applying a compressive force in a direction which is (usually) substantially normal to the resulting interface between the metal surfaces, causing the powder particles to undergo severe deformation, thereby allowing clean powder material particles to make intimate contact with each other and the joint surfaces of the parent metals, thus creating strong bonds between them. Such intimate contact is achieved under an applied load that is above the tensile yield strength of the interface powder, but below the tensile yield strengths of the parent metals. In most cases, the bonding process takes place in an inert atmosphere or in partial vacuum to assure complete bonding. This prevents oxidation of the bonding surfaces.

The softening temperature is defined in the case of cold-work strengthened alloys as the recrystallization temperature, in the case of age-hardened alloys as the age hardening temperature, and in the case of transformation-hardened alloys as the transformation temperature. However, these reactions (recrystallization, averaging, and phase transformation) can occur sluggishly, so that joining temperature may be increased slightly above the softening temperature, if the time at temperature is brief.

The method of the present invention enjoys the advantage of preserving the hardened state of the metals being joined. This means that superior mechanical properties characteristic of the hardened state still remain after low-temperature pressure bonding. Additionally, as a result of the preserved high-strength state, joined assembly weight can be kept to a minimum. In contrast, if the same metals were to be joined by using any of the existing high-temperature joining processes, such as brazing, diffusion bonding and fusion welding, hardened state, as well as the superior properties, would be lost. Here, the mechanical properties under consideration include tensile ultimate and yield strengths, fatigue limit, press-rupture strength, hardness, wear resistance, etc.

These and other objects and advantages of the invention, as well as the details of an illustrative embodiment, will be more fully understood from the following specification and drawings, in which:

DRAWING DESCRIPTION

DETAILED DESCRIPTION

Figure 1:
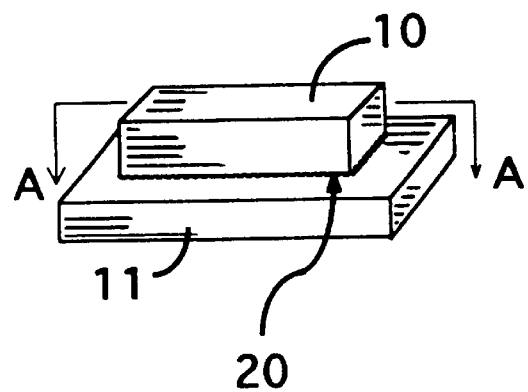
FIG. 1 is a perspective view showing two metal pieces separated by a layer of interface metal powder.

According to a primary aspect of the present invention, metal surfaces are joined by short-time diffusion bonding at or below the softening temperatures of the metal surfaces being joined, by compressing a layer of soft metal particles (interface powder) placed at the joint interface. The present invention may be contrasted with the conventional diffusion bonding process in the following way: bonding pressure in this invention and its rate of application are higher, while times for the second and third stages of diffusion bonding are greatly lower. Intimate contact between bonding surfaces is achieved by application of higher loads and by placing a layer of an interface material, usually a metal powder of the same composition, in a dead-soft state in the joint. Voids in the joint are eliminated by brute force rather than by material transport, due to high-temperature diffusion.

The interface material may or may not be the same alloy as that of surfaces being joined and is in powder form and usually in its dead-soft state. The dead-soft state is defined as the lowest hardness state usually achieved by annealing. Powder particle size is not important in the sense that any commercially available size or range of sizes would be suitable for the process of this invention. Very fine particle sizes should be avoided if the interface powder composition includes highly reactive elements, such as tantalum, titanium, aluminum, calcium, in a non-combined state. Otherwise, when the joint assembly is heated, these elements would tend to oxidize and detrimentally affect the joint mechanical properties. At the opposite end of the size spectrum, particles as large as rice grains, or pieces of small diameter wire, or metal machining chips, and similarly sized and shaped particles, may serve as the interface powder.

The interface powder layer may also be a layer of powder, cold pressed or partially sintered, to have some degree of green strength. The green compressed or partially sintered powder then can be easily placed in the joint. In this way a precise control may be exercised over the thickness and uniformity of the powder layer. In yet another approach, the interface powder may be applied onto one or both of the surfaces to be joined, as a spray of powder carried in a fugitive compound, such as ethyl, methyl alcohol or acetone.

The thickness of the interface powder layer, though a secondary consideration in the present invention, may be selected based on the roughness and fit of the surfaces being joined. For rough surfaces, a thicker layer of powder is preferred.

The bonding pressure applied to the joint should be lower than the yield strength of the metal surfaces being joined, since preferably they are put in their high strength states prior to joining. However, the bonding pressure particles need to be above the yield strengths of the interface powder. This allows the powder to go through severe deformation, creating an intimate contact between the joint surfaces and the powder.

The process preferably should take place in a reducing atmosphere or in partial vacuum or in a non-oxidizing atmosphere in which the most dominant alloying elements would be prevented from forming oxides.

Typical reducing atmosphere constituents include one or more of the following: hydrogen gas, hydrogen and inert gas mixtures, carbon monoxide, carbon monoxide mixed with inert gases (nitrogen, argon, helium, etc.), dissociated ammonia, etc.

Partial vacuum typically ranges between $1 \times 10^{-1}$ torr and $1 \times 10^{-6}$ torr.

Typical non-oxidizing atmosphere constituents include one or more of the following: argon, helium, nitrogen, and their mixtures.

Typical bonding pressures range between 70 MPa and 700 MPa. Such pressures may be applied for time duration ranging from a fraction of a second to several minutes.

Typical bonding temperatures for copper and copper alloys range between 400 and 500 degrees C., and for steels between 375 and 600 degrees C.

Any small amount of stable oxides still remaining are broken up by the severe shear deformation of the interface powder particles.

An example of the advantages of the process of this invention over prior art is as follows: A rocket component is fabricated from an age-hardened copper alloy by high-temperature brazing (1040° C.). Brazing operation requires massive fixturing, which results in slow cooling of the jointed assembly. Slow cooling from the brazing temperature overages the copper alloy and eliminates any possibility of subsequent age hardening treatment. Knowing this, the designer can consider only the as-brazed, dead soft properties of the copper alloy and allow sufficient thickness to accommodate the expected thermal and mechanical loads, resulting in an excessively heavy assembly.

If, however, the present low-temperature, pressure-joining method is available to the designer, the subject fabrication begins with a solution treated and age hardened and/or cold-work hardened copper alloy; and a low-temperature joining method is used to preserve the high-strength state of the copper alloy. Since during the process of joining the interface powder undergoes severe deformation at temperatures below its recrystallization temperature, it would be cold-work hardened and reach a strength level near that of the parent metals joined. This allows the designer to reduce section thicknesses, thus substantially reduce assembly weight.

The method of the present invention can be used to join surfaces composed of virtually any metal. Even materials other than metals may be joined by using the present invention. For example, in joining materials such as oxides, carbides, nitrides, and their mixtures with each other or with metals, bonds created between the interface powder and the ceramic surfaces may be more mechanical in nature than metallurgical.

In a secondary aspect of the present invention, metals which are not suitable for diffusion bonding, due to the formation of brittle diffusion phases at the joint interface, can be successfully bonded using the process of the present invention as bonding takes place within a few seconds too short to cause excessive interdiffusion of elements between the surfaces being joined. In the present invention, the interface powder may also be selected from elements that would not cause detrimental effects when alloyed with the parent metals. The interface powder may also contain fibers, whiskers, and hard particles as strengthening phases or to provide a special property to the joint.

Referring now to FIG. 1, the schematic drawing shows metal pieces 10 and 11, which are to be joined and are initially separated by a layer of interface metal powder 20.

Figure 2:
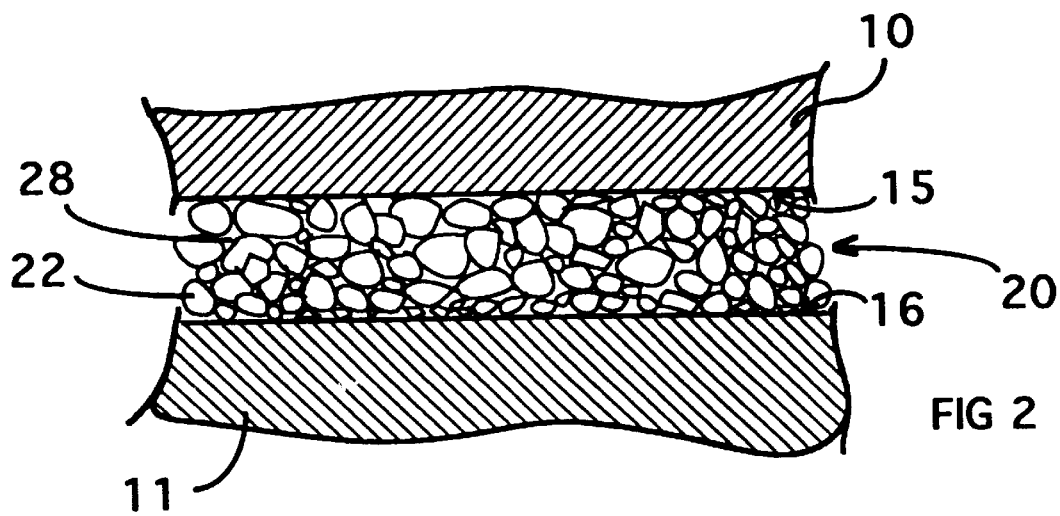
FIG. 2 is an enlarged view of a section taken along lines A—A shown in FIG. 1 before pressure bonding.

FIG. 2 is an enlarged view of the joint showing particles of interface powder layer 20 prior to application of bonding pressure. Note that interface powder particles 22 are loosely held together and that there are voids 28 around particles 22.

Figure 3:
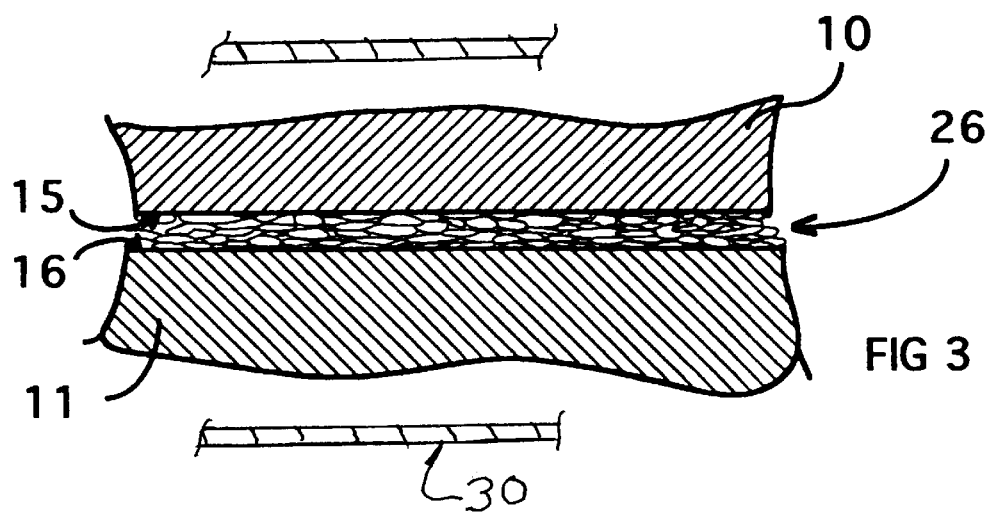
FIG. 3 is an enlarged view of a section taken perpendicular to the bonding surfaces of metal pieces after pressure bonding.

In FIG. 3, metals 10 and 11 are compressed together by application of a pressure magnitude of which is selected to be higher than the compressive yield strength of interface particles 22 and lower than the compressive yields strengths of metal pieces 10 and 11 being joined.

Prior to pressing, the assembly shown in FIG. 1 is heated to the selected bonding temperature. The pieces 10 and 11 are compressed together by application of bonding pressure in a general direction perpendicular to the interface between pieces 10 and 11. As the pressure is applied, interface powder particles 22 shared between 10 and 11, are compressed and sheared. The shearing action breaks up the continuous oxide layers that may be on particles 22, exposing virgin (non-oxidized) metal particle surfaces to each other, causing them to form a metallurgical bond under the applied pressure. Similarly, friction and shearing action of particles 22 on metal surfaces 15 and 16 expose virgin metal, which results in the formation of a metallurgical bond between particles 22 and the metal surfaces 15 and 16.

FIG. 3 depicts the morphology of the interface powder layer after pressure bonding. Powder particles 22 are now flattened and particles have sheared and filled in substantially all voids 28. The initial weakly held-together layer of interface powder layer is now thinner and forms a substantially solid layer 26 without voids. The process of pressing of particles 22 takes place at a temperature at or below their recrystallization temperature. As a result, particles 22 go through cold-work hardening and may become as hard as metals 10 and 11. Depending on the reactivity of metals 10, 11, and the powder 20, heating and pressing processes may take place in a reducing atmosphere. Such an atmosphere may be achieved by partial vacuum or low dew point mixtures of inert gas or gases and hydrogen. An enclosure 30 may be provided for this purpose, i.e., to contain vacuum.

Before bonding, metal pieces 10 and 11 may be hardened so that their hardness is above the hardness of particles 22. Those knowledgeable in the field of metallurgy will know that hardened state may be a state of micro-structure that is harder than the softest state of the metal in question. A hardening process may be selected to provide a desired hardness (or a desired strength level), which may be anywhere between the hardness of the subject metal in its softest state (i.e., annealed state) and the hardest state (i.e., fully hardened state).

Typical metals and metal alloys to be joined together include copper, iron, nickel, cobalt, and their alloys, based on these metals. Mesh sizes of the powder metal particles range between −325 and −16.

EXAMPLE 1

A copper alloy containing zirconium and silver (96.5% copper, 3% silver, and 0.5% zirconium) was low-temperature pressure bonded, in accordance with the process of this invention. The alloy is capable of being hardened with a solution and aging treatment and also by cold working. The specimens used in this study were sectioned from a 90% cold-worked sheet. At this cold-work level, the tensile yield strength of the alloy may be about 483 MPa, and the ultimate tensile strength around 517 MPa. In contrast, in annealed, or as-brazed condition, the yield strength is less than 76 MPa.

Test pieces of the copper alloy measuring 2.5 mm thick×8 mm×8 mm were cleaned to remove by any grease or dirt and rough polished using a 120 grit silicon carbide paper. A thin layer of −150 mesh commercially pure annealed copper powder was applied to one of the 8 mm×8 mm surfaces to be bonded using alcohol as a fugitive fluid carrier. Another test piece of the alloy was placed on top of the first piece already covered with the interface powder. This assembly was heated to 482° C. in a chamber under a partial vacuum of $2 \times 10^{-4}$ torr. After holding at the temperature for about 10 minutes, the two test pieces were pressed toward one another under a load of 275 MPa, held under the load for 10 seconds, and the pressure was released. The joined assembly was cooled to room temperature in air and the joint was shear tested. The shear strength of the bonded joint was 244 MPa. Microscopic examination of the joint indicated that the shear fracture was 100% within the interface powder layer and that the initial coldworked micro-structure of the copper alloy was unaffected by exposure to 482° C.

For copper alloys, a shear strength of 244 MPa corresponds to a tensile yield strength of 415 MPa, which is equal to the tensile yield strength of the zirconium copper alloy in 50% cold-work hardened condition. It is seen therefore that the interface copper powder has cold-work hardened to more than five times its initial dead soft yield strength of 76 MPa.

EXAMPLE 2

Test pieces of a second alloy—Haynes Alloy 188—were low-temperature pressure bonded, in accordance with the process of this invention. Haynes Alloy No. 188 is a cobalt-base alloy containing nominally 22% Cr, 22% Ni, 14% W, up to 3% Fe, 0.35% C, up to 1.25% Mn, and 0.07% La. Because of its faced-centered-cubic matrix, Haynes Alloy 188 can be readily cold-worked for increased strength. Strengthening can be further enhanced by aging the cold-worked structure near 540° C. for a period of 4 to 16 hours to precipitate out $M_6C$ and $M_{23}C_6$ carbides.

The specimens of Haynes Alloy 188 used were sectioned from a sheet having approximately 20% cold reduction after the final mill-anneal. At 20% cold-work, Haynes Alloy 188 has a tensile ultimate strength of about 1310 MPa and a tensile yield strength of 1281 MPa at room temperature.

Test pieces of the Haynes Alloy 188 measuring 2.5 mm thick×8 mm×8 mm were cleaned of any grease or dirt, and rough polished using a 120 grit silicon carbide paper. A thin layer of −325 mesh annealed Haynes Alloy 230 powder was applied to one of the 8 mm×8 mm surfaces to be bonded using alcohol as a fugitive fluid carrier. Another test piece of the alloy was placed on top of the first piece already covered with the interface powder. This assembly was heated to 871° C. in a chamber under a partial vacuum of $2\times10^{-4}$ torr. After holding the temperature for about four minutes, the two test pieces were pressed together under a load of 414 MPa, held under the load for 30 seconds, and the pressure was released. The joined assembly was cooled to room temperature in air and the joint was shear tested. The shear strength of the bonded joint was 280 MPa. The shear fracture was 100% within the interface powder layer and the initial cold-worked micro-structure of the Haynes Alloy 188 was not significantly affected by exposure to 871° C. This is because 871° C. is well below the temperature of 1025° C. at which recrystallization of 20% cold-worked Haynes Alloy 188 takes place (Herchenroeder, R. B. et al., Haynes Alloy 188, Report No. 8024, Stellite Division, Cabot Corporation, Kokomo, Ind., Nov. 5, 1971).

For cobalt base alloys, a shear strength of 280 MPa corresponds to a tensile yield strength of 308 MPa. This strength level can be increased by the use of different interface powders, such as Haynes 188 powder, and by using bonding temperatures around 1000° C. which help increase the bond strength, while still being below the recrystallization temperature of Haynes Alloy 188. Reaction atmosphere can have a substantial effect on bond strength, since the oxidizing potential of the ambient atmosphere determines whether or not the oxide-forming elements present in the interface powder and the base alloys oxidize at the temperatures selected for bonding. Lower partial pressures of vacuum than $2\times10^{-4}$ torr used in these experiments can help improve bond strength.

The surface of the specimens or test pieces facing the joint powder layer were smooth. Roughened surfaces may also be used.

Although the foregoing invention has been described in detail for purposes of clarity of understanding, it will be obvious that certain modifications may be practiced within the scope of appended claims.

I claim:

1. A method for joining a first metal surface to a second metal surface, which includes:
    a) providing powder metal particles substantially all of which have hardnesses lower than the hardnesses of said first and second metal surfaces, at normal temperatures,
    b) locating said particles in a layer between said first and second metallic surfaces, to form an assembly,
    c) heating the assembly to an elevated temperature or temperatures below the softening temperature of said first and second metallic surfaces, and below particle melting temperature or temperatures,
    d) and effecting compression of said layer by and between said first and second surfaces at a pressure level or levels below the compressive yield strengths of said first and second surfaces, and above the compressive yield strengths of said particles, and for a time duration to effect a bond between said first and second metallic surfaces.

2. A method as in claim 1 wherein said first and second metal surfaces are in a partially or fully hardened state.

3. A method for joining a first metal surface to a second metal surface, which includes:
    a) providing powder metal particles substantially all of which have hardnesses lower than the hardnesses of said first and second metal surfaces, at normal temperatures,
    b) locating said particles in a layer between said first and second metallic surfaces, to form an assembly,
    c) heating the assembly to an elevated temperature or temperatures below the softening temperature of said first and second metallic surfaces,
    d) and effecting compression of said layer by and between said first and second surfaces at a pressure level or levels below the compressive yield strengths of said first and second surfaces, and above the compressive yield strengths of said particles, and for a time duration to effect a bond between said first and second metallic surfaces,
    e) and wherein said powder metal particles have chemical composition substantially the same as at least one of said metal surfaces.

4. A method as in claim 3 wherein said surfaces have the same composition.

5. A method of claim 1 wherein said heating takes place in a non-oxidizing or a reducing atmosphere.

6. A method of claim 1 wherein said particles are weakly bonded together to form a green compact prior to said d) step.

7. A method of claim 1 wherein said powder particles are in a fugitive carrier in said b) step.

8. A method for joining a first material surface to a second material surface, said method comprising the steps:
    a) providing and applying a layer of powder metal particles to at least one of the material surfaces, said particles having a hardness lower than the hardnesses of said material surfaces,
    b) bringing the surfaces relatively toward one another to form a joint interface and an assembly,
    c) heating the assembly to a temperature below the softening temperatures of said material surfaces, and below particle melting temperature or temperatures, and
    d) applying a compressive pressure to the surfaces in a direction generally normal to said joint interface, said compressive pressure being at a level between compressive yield strengths of said powder metal particles and compressive yield strengths of said material surfaces.

9. A method as in claim 8 wherein said material surfaces are selected from the group that includes ceramic oxides, nitrides, carbides, metals, and mixtures thereof.

10. A method as in claim 8 wherein said pressure is applied from two opposing directions.

11. A method of claim 8 wherein said heating takes place in a non-oxidizing or a reducing atmosphere.

12. A method of claim 8 wherein said layer of powder metal particles in said layer are weakly bonded together to form a green compact prior to application onto said material surface.

13. A method of claim 8 wherein said layer of powder particles applied onto said surface are in a fugitive carrier.

14. The method of claim 13 wherein said carrier is selected from the group that includes ethyl alcohol, methyl alcohol and acetone.

15. The method of claim 1 wherein said heating takes place in a reducing atmosphere.

16. The method of claim 1 wherein said bond is a metallurgical bond.

17. The method of claim 1 including the step of preliminarily hardening at least one of said first and second metal surfaces.

18. The method of claim 1 wherein said particles include non-oxidized metal covered by oxide film, and wherein said compression effects shearing of particles in said layer to expose particle non-oxidized metal.

19. The assembly produced by the method of claim 1.

20. The process as follows: a first copper alloy part containing about 96.5% copper, about 3% silver, and about 0.5% zirconium is cleaned to remove grease or dirt, and rough polished; a thin layer of about −150 mesh commercially pure annealed copper interface powder is applied to one surface of said part to be bonded using alcohol as a fugitive fluid carrier for the powder; a second part of the same alloy composition is placed on top of the first part surface already covered with the interface powder to form an assembly; the assembly is heated to about 482° C. temperature, in a chamber under a partial vacuum of about $2\times10^{-4}$ torr; and after holding at said temperature for about 10 minutes, the two parts are pressed relatively toward one another under a load of about 275 MPa, then held under said load for about 10 seconds, thereby consolidating said assembly; and the pressure is then released.

21. The process as follows: a first Haynes Alloy No. 188 part containing about 22% Cr, about 22% Ni, about 14% W, up to 3% Fe, about 0.35% C, up to 1.25% Mn, and about 0.07% La is cleaned to remove grease or dirt, and rough polished; a thin layer of about −325 mesh annealed Haynes Alloy 230 interface powder is applied to one surface of said part to be bonded using alcohol as a fugitive fluid carrier for the powder; a second part of the same composition as the first part alloy is placed on top of the first part surface already covered with the interface powder, to form an assembly; the assembly is heated to about 871° C. temperature in a chamber under a partial vacuum of about $2\times10^{-4}$ torr; and after holding said temperature for about four minutes, the two parts are pressed relatively together under a load of about 414 MPa, then held under said load for 30 seconds, thereby consolidating the assembly, and the pressure is then released, and following which the assembly is cooled.

22. The product produced by the process of claim 1.

23. The product produced by the process of claim 8.

* * * * *